(12) United States Patent
Maeng et al.

(10) Patent No.: US 12,472,634 B2
(45) Date of Patent: Nov. 18, 2025

(54) COMPONENT PRE-INSPECTION DEVICE FOR HYBRID IRREGULAR COMPONENT INSERTION ROBOT

(71) Applicant: POWER AUTOMATION CO., LTD., Chungcheongnam-do (KR)

(72) Inventors: Harkdo Maeng, Chungcheongnam-do (KR); Jangseon Hwang, Chungcheongnam-do (KR)

(73) Assignee: POWER AUTOMATION CO., LTD., Chungcheongnam-Do (KR)

( * ) Notice: Subject to any disclaimer, the term of this patent is extended or adjusted under 35 U.S.C. 154(b) by 184 days.

(21) Appl. No.: 18/242,069

(22) Filed: Sep. 5, 2023

(65) Prior Publication Data
US 2024/0075624 A1  Mar. 7, 2024

(30) Foreign Application Priority Data
Sep. 6, 2022  (KR) .................. 10-2022-0112967

(51) Int. Cl.
*B25J 9/16* (2006.01)
*B25J 9/00* (2006.01)
*B25J 9/02* (2006.01)
*B25J 15/06* (2006.01)

(52) U.S. Cl.
CPC ........... *B25J 9/1697* (2013.01); *B25J 9/0093* (2013.01); *B25J 9/026* (2013.01); *B25J 15/0616* (2013.01)

(58) Field of Classification Search
USPC ................................................. 700/245–264
See application file for complete search history.

(56) References Cited

U.S. PATENT DOCUMENTS

| | | | |
|---|---|---|---|
| 5,628,409 A * | 5/1997 | Thomas | B07C 5/3422 |
| | | | 209/939 |
| 5,905,850 A * | 5/1999 | Kaveh | H01L 21/67259 |
| | | | 414/217 |
| 9,661,793 B2 * | 5/2017 | Itoh | B23K 3/0638 |

(Continued)

FOREIGN PATENT DOCUMENTS

| | | |
|---|---|---|
| KR | 10-1997-0002349 A | 1/1997 |
| KR | 10-2005-0025856 A | 3/2005 |

(Continued)

*Primary Examiner* — Jonathan L Sample
(74) *Attorney, Agent, or Firm* — Harness, Dickey & Pierce, P.L.C.

(57) ABSTRACT

There is provided a component pre-inspection device for a hybrid irregular component insertion robot, installed on a transfer unit of a stick feeder type electronic component supplier that transfers components to a component pickup available position provided inside a hybrid irregular component insertion robot. The component pre-inspection device includes: a camera configured to photograph a lower side of the components being guided through the transfer unit in real time; a gantry robot configured to pick up and discharge defective components among the components guided by the transfer unit; and a control unit configured to determine whether the component is acceptable or defective by comparing a component image of the component photographed by the camera to a reference image of the component stored in a memory, and to operate the gantry robot when the component is determined to be defective.

3 Claims, 1 Drawing Sheet

(56) References Cited

U.S. PATENT DOCUMENTS

| | | | | |
|---|---|---|---|---|
| 10,194,570 B2* | 1/2019 | Fukaya | ................... | H05K 13/08 |
| 10,937,683 B1* | 3/2021 | Schlezinger | ...... | H01L 21/67715 |
| 2009/0270015 A1* | 10/2009 | D'Ambra | .............. | B24B 41/005 |
| | | | | 451/28 |
| 2015/0022602 A1* | 1/2015 | Landa | ................... | B41J 11/0021 |
| | | | | 347/102 |
| 2015/0377796 A1* | 12/2015 | Schlezinger | ...... | H01L 21/67288 |
| | | | | 356/72 |
| 2019/0035696 A1* | 1/2019 | Lin | ......................... | H01L 22/12 |
| 2019/0152634 A1* | 5/2019 | Almogy | ................... | B65B 43/58 |
| 2020/0198899 A1* | 6/2020 | Otsuru | ................... | B25J 9/1697 |
| 2020/0269429 A1* | 8/2020 | Chavez | ................ | B25J 15/0616 |
| 2020/0377314 A1* | 12/2020 | Ikeda | ................... | B65G 47/918 |
| 2021/0094137 A1* | 4/2021 | Ooba | ...................... | B25J 9/1679 |
| 2021/0260892 A1* | 8/2021 | Chen | ................... | B05B 13/0242 |
| 2022/0059415 A1* | 2/2022 | Lin | ......................... | H01L 22/24 |
| 2022/0292563 A1* | 9/2022 | Zhang | ................... | G06Q 50/04 |
| 2022/0315358 A1* | 10/2022 | Ryan | ...................... | B25J 9/1697 |
| 2023/0075394 A1* | 3/2023 | Schlezinger | ......... | B65G 49/064 |
| 2023/0349838 A1* | 11/2023 | Schlezinger | .......... | G06T 1/0007 |

FOREIGN PATENT DOCUMENTS

| | | |
|---|---|---|
| KR | 100913627 B1 | 8/2009 |
| KR | 10-2012-0063348 A | 6/2012 |
| KR | 10-2016-0086110 A | 7/2016 |
| KR | 102021536 B1 | 9/2019 |

\* cited by examiner

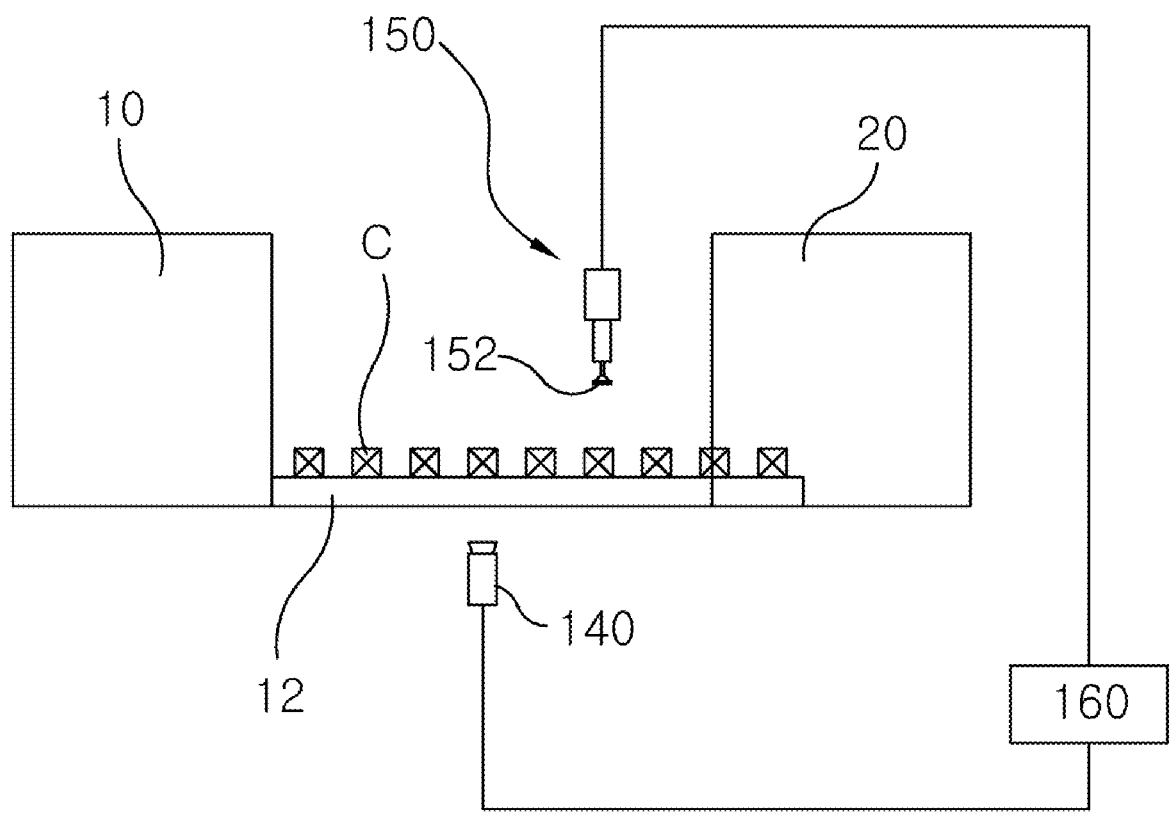

COMPONENT PRE-INSPECTION DEVICE FOR HYBRID IRREGULAR COMPONENT INSERTION ROBOT

CROSS-REFERENCE TO RELATED APPLICATIONS

This application claims the priority of Korean Patent Application No. 10-2022-0112967 filed on Sep. 6, 2022, in the Korean Intellectual Property Office, the disclosure of which is incorporated herein by reference.

FIELD

The present invention relates to a component pre-inspection device for a hybrid irregular component insertion robot that is capable of automatically determining acceptable and defective components supplied to the hybrid irregular component insertion robot from an electronic component supplier prior to loading the components into the hybrid irregular component insertion robot, and removing the defective components.

BACKGROUND

This section provides background information related to the present disclosure which is not necessarily prior art.

In general, an electronic component supplier performs to supply a component to a hybrid irregular component insertion robot.

A tape feeder, a tray feeder, a stick feeder, or the like are being used as the electronic component supplier.

Among the electronic component suppliers described above, the stick feeder categorizes components according to the forms and number of leads formed on a plurality of components arranged in an internal space of the stick and supplies them to the irregular component insertion equipment.

The stick feeder generally includes a transfer unit that transports a component to a component pickup available position so that the component can be picked up to the hybrid irregular component insertion robot, a detection unit that detects whether the component has been picked up when the component was picked up, a component quantity verification unit that detects whether the component inside the stick is consumed, and a stick replacement unit that replaces an empty stick with a new stick.

However, since the components are arranged on the stick of the stick feeder described above regardless of whether the components are defective, there has been a problem in that defective components are supplied to the irregular component insertion equipment, which leads to another problem in that the final product is defective.

SUMMARY

An aspect of the present invention provides a component pre-inspection device for a hybrid irregular component insertion robot that is capable of automatically determining acceptable and defective components supplied to the hybrid irregular component insertion robot from an electronic component supplier prior to loading the components into the hybrid irregular component insertion robot, and removing the defective components.

The problems to be solved by the present invention are not limited to the above-mentioned technical problems, and other technical problems, which are not mentioned above, may be clearly understood from the following descriptions by those skilled in the art to which the present invention pertains.

This section provides a general summary of the disclosure and is not a comprehensive disclosure of its full scope or all of its features.

According to an aspect of the present invention, there is provided a component pre-inspection device for a hybrid irregular component insertion robot, installed on a transfer unit of a stick feeder type electronic component supplier that transfers components to a component pickup available position provided inside a hybrid irregular component insertion robot, the component pre-inspection device may include: a camera configured to photograph a lower side of the components being guided through the transfer unit in real time; a gantry robot configured to pick up and discharge defective components among the components guided by the transfer unit; and a control unit configured to determine whether the component is acceptable or defective by comparing a component image of the component photographed by the camera to a reference image of the component stored in a memory, and to operate the gantry robot when the component is determined to be defective.

In the component pre-inspection device for the hybrid irregular component insertion robot according to an aspect of the present invention, the camera may be installed at a lower portion of the transfer unit and transmits the photographed component image in real time to the control unit, and the transfer unit may be provided to be transparent to enable the camera to photograph a lower portion of the component, or only a portion facing the camera is provided to be transparent.

In the component pre-inspection device for the hybrid irregular component insertion robot according to an aspect of the present invention, the gantry robot may be installed between the camera and the hybrid irregular component insertion robot, and include a vacuum suction gripper configured to pick up the defective component, in which the gantry robot, upon receiving an operation signal transmitted from the control unit, may press the vacuum suction gripper closely against the defective component and suction the defective component, and discharge the defective component to the outside of the transfer unit when the vacuum suction gripper suctions the defective component.

According to the present invention, it is possible to reduce unnecessary inspection motions in the hybrid irregular component insertion robot by automatically determining acceptable and defective components that are supplied from an electronic component supplier to the hybrid irregular component insertion robot and removing defective components before loading the components inside the hybrid irregular component insertion robot, thereby providing the effect of increasing the production volume of the final product.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a view schematically illustrating a component pre-inspection device for a hybrid irregular component insertion robot according to the present invention.

DETAILED DESCRIPTION

Hereinafter, exemplary embodiments of a component pre-inspection device for a hybrid irregular component insertion robot according to the present invention will now be described in detail with reference to the accompanying drawings.

However, it should be noted that the intrinsic technical spirit of the present invention is not limited by the following exemplary embodiment, and the following exemplary embodiment may easily be substituted or altered by those skilled in the art based on the intrinsic technical spirit of the present invention.

In addition, the terms used herein are selected for convenience of description and should be appropriately interpreted as a meaning that conform to the technical spirit of the present invention without being limited to a dictionary meaning when recognizing the intrinsic technical spirit of the present invention.

FIG. 1 is a view schematically illustrating a component pre-inspection device for a hybrid irregular component insertion robot according to the present invention, in which a component pre-inspection device for a hybrid irregular component insertion robot, according to the present invention, is installed on a transfer unit 12 of an electronic component supplier 10 that transfers a component C to a position inside a hybrid irregular component insertion robot 20, that is, to a position where the component can be picked up.

Here, the electronic component supplier 10 may be a conventional stick feeder, and the transfer unit 12 of the electronic component supplier 10 may be a track or rail on which a guide groove (not illustrated) for the component C is formed.

Further, since it is the known art that the electronic component supplier 10 supplies the component C to a component pickup available position that is positioned inside the hybrid irregular component insertion robot 20, a detailed description thereof will be omitted in the present invention.

With reference to FIG. 1, the component pre-inspection device for the hybrid irregular component insertion robot according to the present invention includes a camera 140, a gantry robot 150, and a control unit 160.

First, the camera 140 photographs the components C being guided through the transfer unit 12 of the electronic component supplier 10 in real time, converts an acquired component image into an electrical signal, and transmits the image to the control unit 160 in real time.

Preferably, the camera 140 photographs a lower side of the component C being guided through the transfer unit 12 of the electronic component supplier 10. To this end, the camera 140 is installed at a lower portion of the transfer unit 12 of the electronic component supplier 10, as illustrated.

In this case, the transfer unit 12 of the electronic component supplier 10, i.e., the track or rail, may be provided to be transparent to allow the camera 140 to photograph the lower portion of the component C, or only a portion facing the camera 140 may be provided to be transparent.

For example, the camera 140 may be a conventional charge-coupled device (CCD) sensor or a complementary metal oxide semiconductor (CMOS) sensor.

The gantry robot 150 picks up a defective component C among the components C guided through the transfer unit 12 of the electronic component supplier 10 and discharges the defective component C outside the transfer unit 12 of the electronic component supplier 10.

The gantry robot 150 is installed between the camera 140 and the hybrid irregular component insertion robot 20, and the gantry robot 150 includes a vacuum suction gripper 152 that picks up the defective component C.

That is, when the control unit 160 determines that the component C photographed by the camera 140 is the defective component C, the control unit 160 transmits an operation signal to the gantry robot 150, when the gantry robot 150 receives the operation signal transmitted by the control unit 160, the gantry robot 150 presses the vacuum suction gripper 152 closely against the defective component C, and suctions the defective component C, and when the vacuum suction gripper 152 suctions the defective component C, the gantry robot 150 discharges the defective component C to the outside of the transfer unit 12 of the electronic component supplier 10.

Here, the configuration of the vacuum suction gripper 152 suctioning the defective component C and putting down the suctioned defective component C is the known art, and thus a detailed description thereof is omitted in the present invention.

In addition, any configuration of the gantry robot 150 is not particularly limited in the present invention. However, any configuration and form of the gantry robot 150 is possible as long as the gantry robot 150 is capable of performing the operation described above.

The control unit 160 controls the operation of the camera 140 and the gantry robot 150, and determines acceptable and defective components C guided through the transfer unit 12 of the electronic component supplier 10.

That is, the control unit 160 receives the component image signal of the component C transmitted from the camera 140, and compares the component image signal of the component C with a reference image of the component C stored in the memory to determine whether the component C is acceptable or defective.

For example, when the component C in the component image is rotated to the left side or right side of the component in the reference image by comparing the reference image to the component image, it is determined to be defective, and when they are identical, it is determined to be acceptable. In addition, when the component C in the component image is not matched in an external form (broken or lead bent) by comparing the reference image with the component image, it is determined to be defective, and when matched, it is determined to be acceptable.

Further, when the control unit 160 determines that the component is defective by comparing the reference image and the component image, the control unit 160 simultaneously transmits an operation signal to the gantry robot 150 to enable the gantry robot 150 to discharge the defective component C to the outside.

As set forth above, according to exemplary embodiments of the invention, a component pre-inspection device for hybrid irregular component insertion robot, according to the present invention, automatically determines acceptable and defective components C that are supplied from the electronic component supplier 10 to the hybrid irregular component insertion robot 20 prior to loading the components C inside the hybrid irregular component insertion robot 20, and removes the defective components C, thereby reducing unnecessary inspection motions in the hybrid irregular component insertion robot 20, and accordingly increasing the production volume of the final product.

While the present invention has been shown and described in connection with the exemplary embodiments, it will be apparent to those skilled in the art that modifications and variations can be made without departing from the spirit and scope of the invention as defined by the appended claims.

What is claimed is:

1. A component pre-inspection device for a hybrid irregular component insertion robot, installed on a transfer unit of a stick feeder type electronic component supplier that transfers components to a component pick up available position provided inside a hybrid irregular component insertion robot so as to automatically determine acceptable and defective components before the components are loaded in the component pick up available position, and to remove the defective components, the component pre-inspection device comprising:
   a camera configured to photograph a lower side of the components being guided through the transfer unit in real time;
   a gantry robot configured to pick up and discharge defective components among the components guided by the transfer unit; and
   a control unit configured to determine whether the component is acceptable or defective by comparing a component image of the component photographed by the camera to a reference image of the component stored in a memory, and to operate the gantry robot when the component is determined to be defective,
   wherein the camera is installed at a lower portion of the transfer unit and transmits the photographed component image in real time to the control unit,
   wherein the transfer unit is provided to be transparent to enable the camera to photograph a lower portion of the component, or only a portion facing the camera is provided to be transparent,
   wherein the gantry robot is installed above the transfer unit and the hybrid irregular component insertion robot, and comprises a vacuum suction gripper configured to pick up the defective component, and
   wherein the transfer unit is a track or rail on which a guide groove for the components is formed.

2. The component pre-inspection device of claim 1, wherein the camera is provided as a CCD sensor or a CMOS sensor.

3. The component pre-inspection device of claim 1, wherein the gantry robot, upon receiving an operation signal transmitted from the control unit, presses the vacuum suction gripper closely against the defective component and suctions the defective component, and discharges the defective component to the outside of the transfer unit when the vacuum suction gripper suctions the defective component.

* * * * *